Patented Dec. 6, 1949

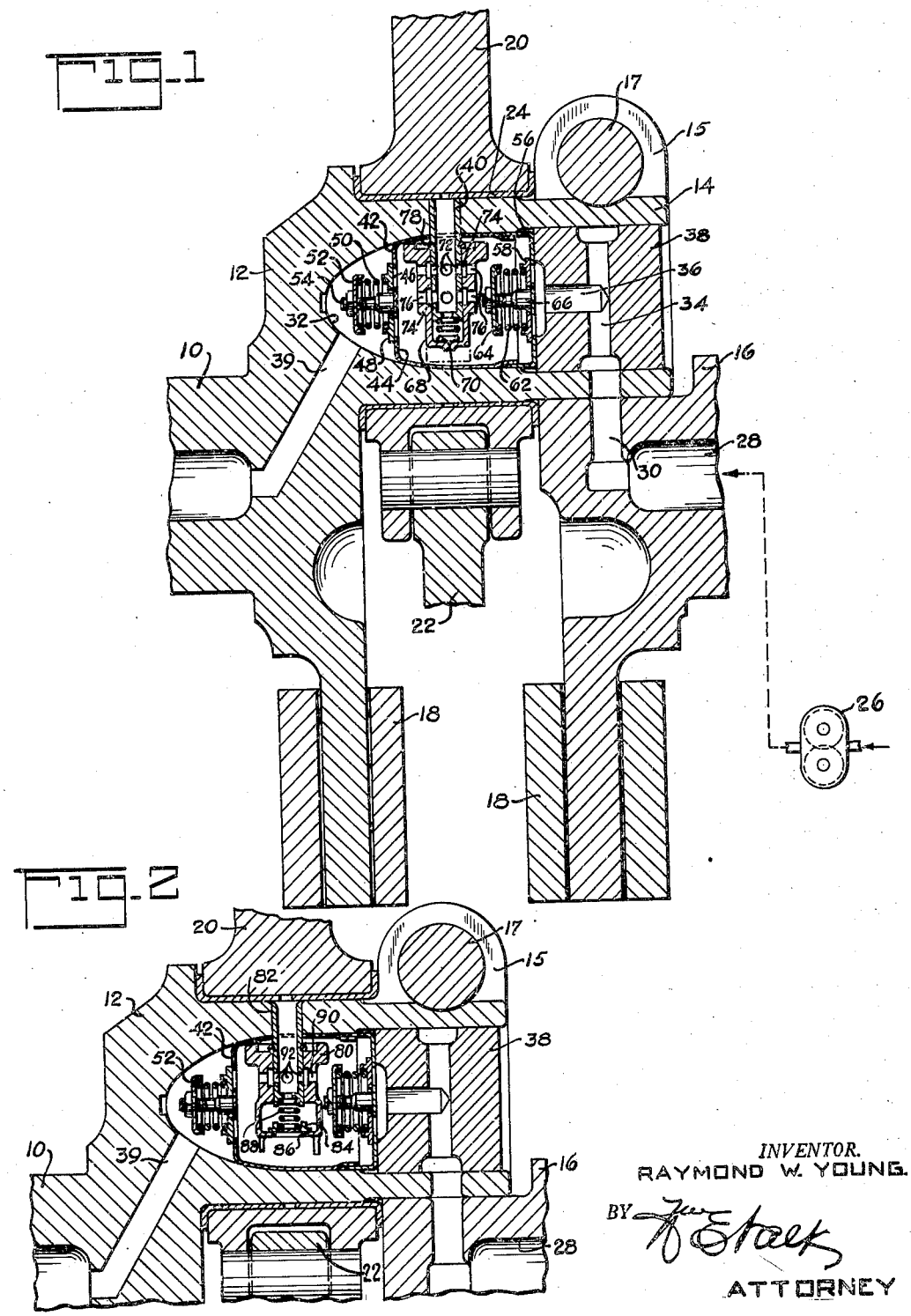

2,490,293

UNITED STATES PATENT OFFICE 2,490,293

CRANKPIN LUBRICATION MEANS

Raymond W. Young, Hohokus, N. J., assignor to Wright Aeronautical Corporation, a corporation of New York Application April 23, 1946, Serial No. 664,330

7 Claims. (Cl. 184—6)

This invention relates to means for controlling the supply of lubricating oil to a bearing surface and is particularly directed to means for controlling the flow of lubricating oil to a bearing surface on a member arranged for rotation about an axis spaced from its geometric axis, as in the case of a crankshaft crankpin.

In internal combustion engines, it is conventional practice to lubricate the bearing surface between a crackshaft crankpin and its associated connecting rod structure by lubricating oil supplied from the interior of the crankpin. When the engine is idle, the oil drains out from the various bearing surfaces as well as from the interior of the crankshaft and its crankpin. In the case of an engine having cylinders extending downwardly from the engine crankshaft, as in conventional radial cylinder aircraft engines, the oil draining from the interior of the engine crankshaft and the various bearing surfaces of the engine after the engine stops may flow into these lower engine cylinders. The oil thus flowing into the lower engine cylinders may leak past their pistons and cause damage to the engine when it is subsequently started. Also, in internal combustion engines, lubricating oil is supplied to the various bearing surfaces of the engine by an engine driven oil pump. Accordingly, there may be an appreciable time interval between the starting operation of the engine and the time at which the oil pump delivers oil to the various engine bearing surfaces. During this time interval, the various bearing surfaces of the engine may run with little or no lubricating oil.

It is an object of this invention to provide means associated with the engine crank pin for preventing leakage of oil out from the interior of the crankpin after the engine stops. With this construction, in an engine having downwardly extending cylinders, there is a substantial reduction in the quantity of oil flowing into the lower engine cylinders when the engine stops, therby minimizing the possibility, when the engine is subsequently started, of damage to the engine because of oil in the combustion chambers. It is a further object of this invention to provide means for utilizing the oil thus retained in the crankpin while the engine is idle for lubricating the crankpin bearing surfaces while the engine is being started. The arrangement is such that when the engine is being started, oil is supplied to the crankpin-connecting rod bearing surface before oil is supplied thereto from the lubricating oil pump, thereby avoiding dry operation of the crankpin-connecting rod bearing at the start of engine operation.

Other objects of this invention will become apparent upon reading the annexed detailed description in connection with the drawing in which:

Figure 1 is a sectional view through an engine crankshaft embodying the invention; and Figure 2 is a sectional view of a modification.

Referring to the drawing, an engine crankshaft 10 has formed integral therewith a crankcheek 12 with a crankpin 14 extending therefrom with its axis spaced from the crankshaft axis. A crankcheek 15, having a shaft portion 16 extending therefrom, is secured to the crankpin 14 by means of a conventional clamp joint drawn together by a bolt 17. As far as the invention is concerned, the crankcheek 15 may be formed integral with the crankshaft 10. Each crankcheek 12 and 14 is provided with the usual counterweight structure 18.

A connecting rod 20 is articulated about the crankpin 14 and the outer end of the connecting rod is pivotally connected to an engine piston (not shown). In the usual manner, reciprocation of the pistons effect rotation of the crankshaft 10. The connecting rod 20 may comprise a so-called master connecting rod with one or more auxiliary connecting rods 22 pivotally connected thereto. A suitable bushing 24 may be disposed between the hub of the master rod and the crankpin 14.

The engine crankshaft 10, 16 is drivably connected to an oil pump 26 which supplies lubricating oil under pressure to an internal passage 28 in the crankshaft and crankcheek 15. The crankcheek 15 is provided with a radial passage 30 communicating with the passage 28 and communicating with a chamber 32 within the crankpin 14 via passages 34 and 36 in a plug 38 closing one end of the chamber 32. A passage 39 in the crankcheek 12 also communicates with the chamber 32 for supplying lubricating oil to other bearing surfaces. A hollow tube 40 projects into the crankpin chamber 32 from the outer surface of the crankpin 14. The arrangement is such that lubricating oil flows out from the chamber 32 through the tube 40 for lubricating the bearing surface between the master connecting rod 20 and the crankpin. With this construction, any heavy impurities or foreign matter in the oil are thrown out against the outer wall of the chamber 32 with respect to crankshaft axis by the centrifugal forces acting thereon during crankshaft rotation. In this way, since the tube 40 projects down into the chamber 32, these impurities do not flow to the crankpin bearing surfaces. The structure so far described is conventional.

In order to provide means to seal the chamber 32, a hollow member 42 fitted therein is formed with an end portion 44 extending across the chamber 32. This end portion 44 is provided with one or more openings 46 and forms a seat for a check valve 48. The check valve 48 is urged against the end portion 44 by a spring 50 disposed between the check valve 48 and a washer 52 carried on a shaft-like projection 54 rigid with the end portion 44. The other end of the hollow member 42 is closed by a cap 56 carried by the plug 38. The cap 56 forms a seat for a check valve 58 cooperating with one or more openings 60 in the cap. The check valve 58 is held against the cap by a spring 62 disposed between the check valve and a washer 64 carried by a projection 66 rigid with the cap 56.

The check valve 58 is arranged to admit oil under pressure from the pump 26 through passages 28, 30, 34 and 36 into the chamber 32 but not in the reverse direction. The check valve 48 is arranged to permit oil flow from the chamber 32 to the passage 39 but not in the reverse direction. The check valve springs 50 and 62 are designed so that only a small force is required to open their check valves whereby the check valves offer very little restraint to the normal flow of oil for lubricating the engine. When the engine is shut down, these springs 50 and 62 close their associated check valves thereby closing the two ends of the chamber 32.

The tube 40 is provided with a valve sleeve 68 slidably disposed thereabout. A spring 70 is disposed between the inner end of the tube 40 and the adjacent end of the sleeve valve 68. The tube 40 is provided with one or more radial passages 72 adapted to be alined with an annular groove or grooves 74 and radial passages 76 in the sleeve valve 68. The sleeve valve 68 is arranged to move radially outwardly along the tube 40 against the spring 70 and a split ring 78 may be provided about the tube 40 to prevent further outward movement when said passages 72, 74 and 76 are in alinement.

With this construction, when the engine is shut down, the spring 70 moves the sleeve valve 68 radially inwardly against the inner side of the chamber 32 thereby moving passages 72 and 76 out of alinement. Also, when the engine is shut down, the check valves 48 and 58 close as previously described. Accordingly, the chamber 32 is completely sealed and leakage of oil from the chamber 32 through the tube 40 is prevented. Therefore, the quantity of oil draining into the lower engine cylinders, when the engine is idle, is substantially reduced.

When the engine is subsequently started, the sleeve valve 68 immediately slides radially outwardly along the tube 40 under the centrifugal force acting on the sleeve valve 68. Thereupon, the passages 72 and 76 become alined and oil within the chamber 32 is forced out through the tube 40 by the centrifugal force acting on this oil.

In this way, oil flows over the crankpin bearing surface as soon as the engine starts to rotate even though there may be an appreciable time delay between the initial rotation of the engine and the time when oil under pressure is transmitted to the chamber 32 from the pump 26.

Figure 2 illustrates a modification generally similar to Figure 1 and similar parts have been designated by similar reference numerals. In Figure 2, a sleeve valve 80 is slidable along a tube 82 as in Figure 1, but the valve has been modified slightly in that a poppet-type check valve 84 has been added to the sleeve valve. As herein used, a poppet-type valve is a valve movable off and away from its seat as distinguished from a slide valve.

As illustrated in Figure 2, the radial inner end of the sleeve valve 80 has an opening 86 against which the valve 84 is urged by a spring 88 disposed between the valve 84 and the inner end of the tube 82. With this construction, even though the slidable sleeve valve 80 should stick in its radially inward or closed position, as soon as the engine starts to rotate, the centrifugal force acting on the valve member 84 will move this valve to open the port 86 whereupon the crankpin bearing immediately receives oil. Also, oil pressure from the pump 26, once received in the chamber 32, will open or hold the valve 84 open if the slide valve 80 sticks closed.

Except for the addition of the poppet valve 84, the sleeve valve 80 of Figure 2 is designed to operate in a manner similar to the sleeve valve 68 of Figure 1. That is, when the engine is shut down, the spring 88 moves the sleeve valve radially inwardly thereby moving valve passages 90 out from alinement with passages 92 in the tube 82. When the engine starts, the centrifugal force acting on the sleeve valve 80 moves the valve radially outwardly against the spring 88 to alined passages 90 and 92 whereupon the crankpin bearing receives oil as soon as the engine starts. In addition, the poppet-type valve 84 acts as a safety valve to insure lubrication of the crankpin bearing even though the sleeve valve 80 sticks.

It is also within the scope of this invention to entirely eliminate the slidable sleeve valve 80 and in its place substitute a poppet-type valve similar to the valve 84 in Figure 2. For example, Figure 2 could be modified by forming the sleeve 80 rigid with the tube 82 and by eliminating the passages 90 and 92.

With the above constructions, applicant has provided simple means for preventing the drainage of oil from a crankshaft crankpin while the engine is shut down. In addition, an oil supply is available for lubricating a crankpin bearing surface when the engine is being started and before the normal oil pressure from the engine oil pump reaches the crankpin. At the same time, applicant has retained the function of the tube extending into the chamber within the crankpin for separating out relatively heavy foreign matter from the oil before it reaches the crankpin bearing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, a crankshaft having a crankpin, a chamber within said crankpin, a passage within said crankshaft through which lubricating oil is arranged to be supplied under pressure to said chamber, a tube projecting into said crankpin chamber radially inwardly toward the cankshaft axis, said tube having a passage through its wall for supplying lubricating oil from said chamber through said tube to a crankpin bearing surface, a sleeve valve member slidable along said tube for opening or closing said tube passage, said sleeve valve member being arranged to move radially outwardly to its valve open position in response to the centrifugal force acting thereon when said crankshaft rotates, said sleeve valve member having an opening at its inner end, a poppet-type check valve for controlling said opening, said check valve being disposed so that the pressure of the lubricating oil supplied to said chamber and the centrifugal force acting on said check valve upon crankshaft rotation both tend to open said valve for supplying lubricating oil from said chamber through said tube to a crankpin bearing surface, and spring means for urging said sleeve valve and check valve toward their closed positions.

2. In combination; a crankshaft having a crankpin; a chamber within said crankpin; a passageway in said crankshaft; a pump for supplying lubricating oil under pressure through said passageway to said chamber; a valve automatically operable to close said passageway when said crankshaft stops; a passageway for supplying lubricating oil from said chamber through said crankpin to a bearing surface of said crankpin; and a valve automatically operable to close said crankpin passageway when said crankshaft stops.

3. In the combination recited in claim 2 and including another passageway in said crankshaft communicating with said crankpin chamber; and a valve automatically operable to close said last-mentioned passageway when said crankshaft stops.

4. In the combination recited in claim 3 and including springs for effecting closure of said valves when said crankshaft stops.

5. In combination; a crankshaft having a crankpin; a chamber within said crankpin; a passageway in said crankshaft; a pump drivably connected to said crankshaft for supplying lubricating oil under pressure through said passageway to said chamber; a valve for said passageway; a spring urging said valve in a closing direction against the output pressure of said pump so as to close said valve when the crankshaft stops; a passageway for supplying lubricating oil from said chamber through said crankpin to a crankpin bearing surface; a valve for said crankpin passageway, said valve being arranged to open in response to the centrifugal force acting thereon during crankshaft rotation; and a spring for urging said last-mentioned valve in a closing direction.

6. In combination; a crankshaft having a crankpin; a chamber within said crankpin; a passageway in said crankshaft; a pump drivably connected to said crankshaft for supplying lubricating oil under pressure through said passageway to said chamber; a valve for said passageway; means for closing said valve when the crankshaft stops; a tube projecting into said chamber radially inwardly toward the crankshaft axis for supplying lubricating oil from said chamber to a bearing surface of said crankpin; a valve for said tube, said valve being arranged to open in response to the centrifugal force acting thereon during crankshaft rotation; and means for urging said last mentioned valve in a closing direction.

7. In the combination recited in claim 6 and including a second passageway in said crankshaft communicating with said crankpin chamber; a valve for said second passageway; and means for closing said last-mentioned valve when said crankshaft stops.

RAYMOND W. YOUNG.

REFERENCES CITED

The following references are of record in the file of this patent:

UNITED STATES PATENTS

| Number | Name | Date |
| --- | --- | --- |
| 2,157,242 | Meagher | May 9, 1939 |
| 2,225,136 | Taylor | Dec. 17, 1940 |
| 2,289,233 | Beall | July 7, 1942 |